(12) United States Patent
Van Fossen

(10) Patent No.: US 8,361,261 B2
(45) Date of Patent: Jan. 29, 2013

(54) METHOD FOR MANUFACTURING A SECONDARY CONTAINMENT LINER SYSTEM

(76) Inventor: Peter A. Van Fossen, Plant City, FL (US)

(*) Notice: Subject to any disclaimer, the term of this patent is extended or adjusted under 35 U.S.C. 154(b) by 0 days.

(21) Appl. No.: 13/068,356

(22) Filed: May 9, 2011

(65) Prior Publication Data

US 2011/0278302 A1 Nov. 17, 2011

Related U.S. Application Data

(60) Provisional application No. 61/395,127, filed on May 8, 2010.

(51) Int. Cl.
- *E04B 1/00* (2006.01)
- *E04F 15/18* (2006.01)
- *B29C 65/48* (2006.01)
- *B32B 37/00* (2006.01)
- *B32B 38/08* (2006.01)
- *B32B 43/00* (2006.01)
- *B32B 27/00* (2006.01)

(52) U.S. Cl. ......... 156/71; 156/182; 156/278; 156/280; 156/304.3; 156/307.7

(58) Field of Classification Search ............ 156/71, 156/91, 92, 182, 278, 280, 304.1, 304.3, 156/304.6, 304.7, 307.1, 307.3, 307.5, 307.7
See application file for complete search history.

(56) References Cited

U.S. PATENT DOCUMENTS

| | | | | |
|---|---|---|---|---|
| 2,211,958 A | * | 8/1940 | Mahaffey | 137/154 |
| 3,156,099 A | * | 11/1964 | Dailey | 405/121 |
| 3,537,267 A | * | 11/1970 | Webb | 405/53 |
| 4,110,947 A | * | 9/1978 | Murray et al. | 52/249 |
| 4,366,846 A | * | 1/1983 | Curati, Jr. | 141/1 |
| 4,393,634 A | * | 7/1983 | McDermott et al. | 52/309.1 |
| 4,401,135 A | * | 8/1983 | Andra et al. | 138/118.1 |
| 4,406,403 A | * | 9/1983 | Luebke | 238/2 |
| 4,546,589 A | * | 10/1985 | Seaman | 52/518 |
| 4,682,911 A | * | 7/1987 | Moreland | 588/259 |
| 4,865,899 A | * | 9/1989 | Reichert | 428/189 |
| 4,896,993 A | * | 1/1990 | Bohnhoff | 404/33 |
| 4,960,346 A | * | 10/1990 | Tamayo | 405/52 |
| 5,056,960 A | * | 10/1991 | Marienfeld | 405/270 |
| 5,084,119 A | * | 1/1992 | Barksdale | 156/157 |
| 5,254,661 A | * | 10/1993 | Wilson | 428/57 |
| 5,273,373 A | * | 12/1993 | Pouyer | 404/35 |
| 5,288,168 A | * | 2/1994 | Spencer | 405/54 |
| 5,544,976 A | * | 8/1996 | Marchbanks | 405/129.6 |
| 5,833,401 A | * | 11/1998 | Olson | 405/129.75 |
| 5,850,144 A | * | 12/1998 | Howells et al. | 324/559 |
| 6,004,070 A | * | 12/1999 | Van Camp | 405/129.55 |
| 6,053,662 A | * | 4/2000 | Scuero | 405/107 |
| 6,056,477 A | * | 5/2000 | Ueda et al. | 405/54 |
| 6,238,137 B1 | * | 5/2001 | Whitworth et al. | 405/38 |
| 6,238,766 B1 | * | 5/2001 | Massett et al. | 428/99 |
| 6,361,245 B1 | * | 3/2002 | Polivka | 404/73 |
| 6,431,793 B1 | * | 8/2002 | Whitworth et al. | 405/129.55 |
| 6,481,934 B1 | * | 11/2002 | Alexiew | 405/302.7 |
| 6,619,879 B1 | * | 9/2003 | Scuero | 404/74 |
| 6,887,515 B2 | * | 5/2005 | Zickell | 427/186 |
| 7,207,743 B2 | * | 4/2007 | Polivka, Jr. | 404/73 |
| 7,874,764 B2 | * | 1/2011 | Fossen et al. | 405/60 |
| 2003/0070391 A1 | * | 4/2003 | Tachauer et al. | 52/745.21 |

* cited by examiner

*Primary Examiner* — Sing P Chan
(74) *Attorney, Agent, or Firm* — William E. Noonan

(57) ABSTRACT

A method of assembling a secondary containment liner includes providing at least a pair of uncoated, impermeable sheet components. Respective substrate elements are secured to corresponding edges of the sheet components such that the substrate elements overlap the corresponding edges of the respective sheet components. The substrate elements are themselves overlapped and an impermeable coating is applied to the overlapping substrate elements to sealably bond the adjoining sheet components to one another and thereby define an assembled liner.

18 Claims, 5 Drawing Sheets

METHOD FOR MANUFACTURING A SECONDARY CONTAINMENT LINER SYSTEM

RELATED APPLICATION

This application claims the benefit of U.S. Provisional Patent Application Serial No. 61/395,127 filed May 8, 2010.

FIELD OF THE INVENTION

This invention relates to a method for assembling a secondary containment liner system of the type used to capture and contain accidentally discharged petroleum, chemicals and other hazardous liquids.

BACKGROUND OF THE INVENTION

Secondary containment systems are widely employed for above-ground petroleum storage tanks, chemical storage tanks and similar facilities in order to capture hazardous liquid that leaks or spills from the tank. Secondary containment is also used for retention ponds, lakes and similar facilities to prevent polluting substances such as drill water, acids, gases and unsafe chemicals from entering the water table. Conventional secondary containment systems employ an impermeable or impervious liner that extends across a basin or retention area. The liner, which is designed to prevent petroleum, chemicals or other hazardous materials from seeping into the ground, typically comprises a plurality of juxtaposed geotextile fabric panels, which must be cut and then arranged and assembled across the containment area. A waterproof coating material, such as polyurea, is sprayed onto the assembled liner to render the liner impermeable to the passage of hazardous liquids discharged into the containment area.

Prior methods of assembling and installing secondary containment liners on-site have generally been extremely time consuming, costly and inefficient. Spraying polyurea onto the liner in the field requires that large amounts of polyurea coating and affiliated applicator equipment be transported to and from the secondary containment site. The coating itself is typically transported to the site in 55 gallon drums. After the drums are emptied and the coating is applied to the geotextile fabric, the drums must be removed for disposal. In addition, bulky applicator equipment including pumps, hoses, etc. must be transported to and from the secondary containment site. A considerable number of man hours are usually required to apply the coating completely over the fabric. All of this adds greatly to the complexity and expense of installing the secondary containment system.

Not only are the assembly and installation of conventional liner systems on-site logistically complicated, unduly time consuming and costly, the polyurea and geotextile fabric constituents themselves are also extremely expensive. In addition, a significant amount of polyurea tends to be wasted during the application procedure due to adverse weather conditions, equipment failures, applicator errors, etc. Even when such liner systems are properly installed, the time and labor required for such installation tend to dramatically increase the cost of the secondary containment system.

SUMMARY OF THE INVENTION

It is therefore an object of the present invention to provide an improved method for assembling and installing a secondary containment liner system, which significantly reduces the time, labor, equipment and expense required for assembling and installing such systems.

It is a further object of this invention to provide a secondary containment liner system and related method for assembling such a system that does not rely upon polyurea or other sprayed-on coatings as the principle means for rendering the liner impermeable to hazardous liquids, and which instead uses readily available impermeable liner materials such as XR5™, HDPE or the like.

It is a further object of this invention to provide a method for assembling and installing a secondary containment liner system that is much simpler, faster and less expensive to perform than conventional techniques of on-site liner installation.

It is a further object of this invention to provide a method of assembling and installing a secondary containment liner system that significantly reduces the amount of material, equipment and labor needed to install a secondary containment liner for a petroleum or hazardous chemical storage tank, retention pond or similar facility requiring secondary containment protection.

It is a further object of this invention to provide a method wherein individual secondary containment pieces may be assembled quickly and efficiently on-site without the burdensome logistic requirements, waste, inefficiency and expense commonly exhibited by conventional methods of secondary containment liner installation.

This invention results from a realization that improved, efficient and cost effective installation of a secondary containment liner system may be accomplished by constructing the liner from individual pieces or sections of impermeable sheet material such as XR5™, HDPE or the like which do not require the application of polyurea or other waterproof coating materials to render the pieces impermeable. Rather, individual sheets of naturally impermeable XR5™, HDPE or the like are bonded together in the manner taught by this invention in a fast and cost-efficient manner to provide for a highly reliable liner suitable for use in virtually any secondary containment application.

This invention features a method of assembling a secondary containment liner system for use in connection with an above-ground liquid storage tank or other liquid retention facility. First and second impermeable sheet components are provided. A first substrate element is fastened to a corresponding edge of the first sheet component such that the first substrate element extends outwardly from the corresponding edge of the first sheet component. A second substrate element is similarly secured to and projects from a corresponding edge of the second sheet component. The respective substrate elements are overlapped and a liquid impermeable coating material is applied to the overlapping substrate elements to sealably bond the overlapping substrate elements together and form a liquid impermeable strip between the liquid impermeable sheet components.

In a preferred embodiment, the liquid impermeable sheet components are uncoated and include a liquid impermeable material such as XR5™, HDPE or other material that does not require application of a liquid impermeable coating in order to exhibit liquid impermeability. The overlapping substrate elements may be sealably bonded to one another by a coating agent such as polyurea, polyurethane or the like.

The substrate element is manufactured separately from the impermeable sheet component and may include a screen mesh or other type of coating absorbent or supportive fibrous material. The substrate element is bonded or otherwise fastened to a corresponding edge of the liquid impermeable sheet component by various means including, but not necessarily limited to, gluing, stitching or various forms of heat welding. This step may be performed on-site, at the location where the liner system is installed or in a manufacturing facility prior to delivery of the liner system to the installation site.

The method of this invention also features attaching a secondary containment liner system to a storage tank, ring wall, pipes or other existing penetrations on or proximate the site of the secondary containment facility. In such cases, an absorbent substrate element is fastened, as previously described, to a corresponding edge of a liquid impermeable sheet component. The substrate element is overlapped with an existing penetration of the containment facility. An adhesive is applied to the substrate element to secure the substrate element and attached sheet component to the penetration structure.

Multiple substrate elements may be secured to respective corresponding edges of a sheet component such that multiple sheet components may be fastened to one another and/or to penetration structures of the containment facility as needed to provide a desired degree of secondary containment coverage. The individual sheet components may be arranged and assembled to accommodate various sizes and configurations of secondary containment facilities.

In alternative embodiments an absorbent backing strip maybe attached to a respective liquid impermeable liner component such that the backing strip extends along but not beyond a respective edge of the liner component. A piece of geotextile fabric or other material for absorbing and supporting adhesive coating may be attached adhesively to the backing strip such that it extends beyond the respective edge of the liner component. The attached fabric may overlap the backing strip of an adjoining liner piece and liquid impermeable coating material may be applied to the fabric and respective backing pieces. The applied coating material is allowed to cure to form a liquid impermeable seal between the liner components. Alternatively, the geotextile fabric may overlap and be bonded to a penetration structure (i.e. ring wall, tank, pipe) of a secondary containment system.

In another version, a pair of liner components having respective backing strips, as previously described, are juxtaposed and overlapped. One of the liner components is inverted, liquid impermeable coating is applied to one or both of the backing strips and those strips are pressed together. Finally, the coating material is allowed to cure, which forms a liquid impermeable seal between the liner components.

DETAILED DESCRIPTION OF PREFERRED EMBODIMENTS

Other objects, features and advantages will occur from the following description of a preferred embodiment and the accompanying drawings, in which.

Figure 7:
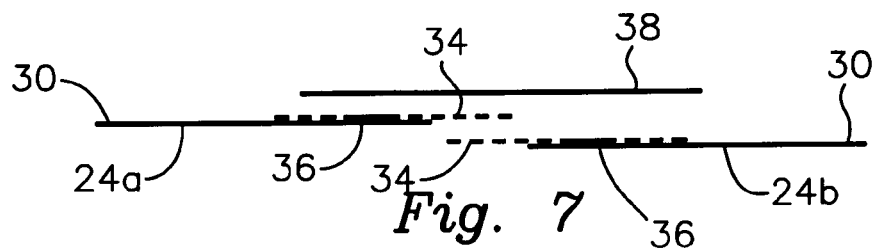
Figure 8:
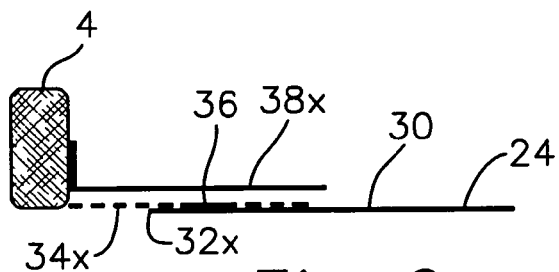

FIG. 7 is a side elevational and schematic view of the manner of joining a pair of adjacent liner components together by means of respective overlapping substrate elements attached to corresponding edges of the liner components and sealably bonded together by a liquid impermeable coating; and FIG. 8 is a side elevational and simplified schematic view of the liner component and attached substrate element secured to a ring wall or other penetration structure adjacent to the containment system.

Figure 9:
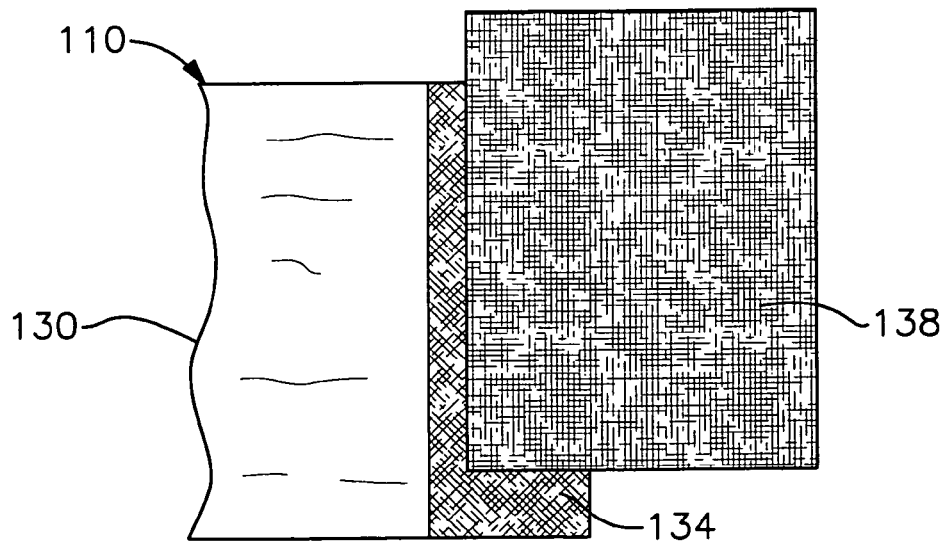
Figure 10:
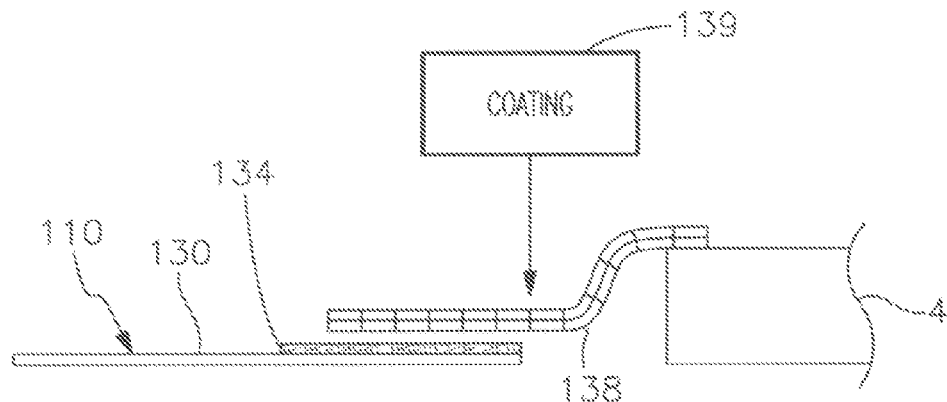
Figure 11:
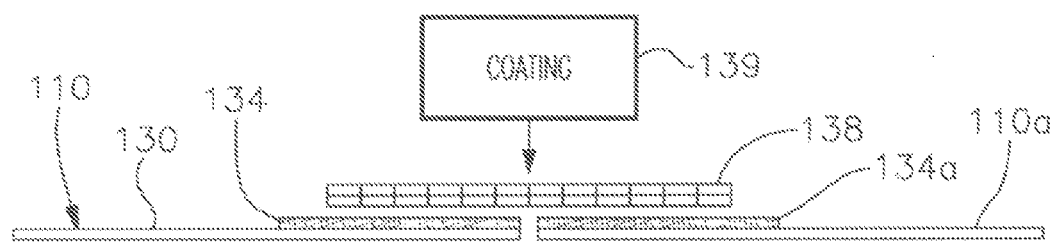
Figure 12:
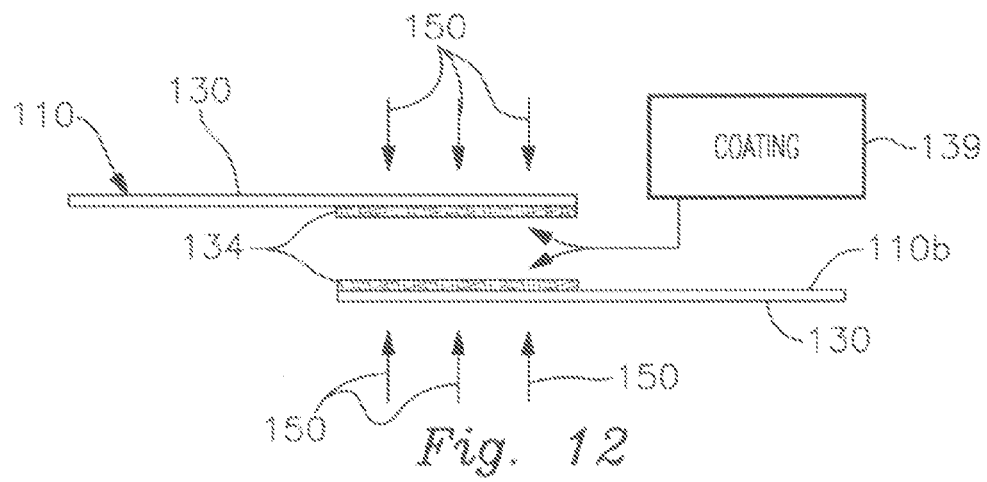

FIG. 9 is a perspective view of an alternative version of this invention wherein an absorbent backing strip substrate is applied to a liquid impermeable liner along an edge thereof and wherein a geotextile fabric is attached to the backing strip;

FIG. 10 is a schematic view of the liner of FIG. 9 being adhered to a penetration structure (ring wall) of a liquid storage tank;

FIG. 11 is a schematic view of the geotextile fabric being used to adhesively interconnect a pair of adjoining liner components having respective backing strips; and FIG. 12 is a schematic view of a pair of liner components being adhesively joined along respective backing strips.

Figure 1:
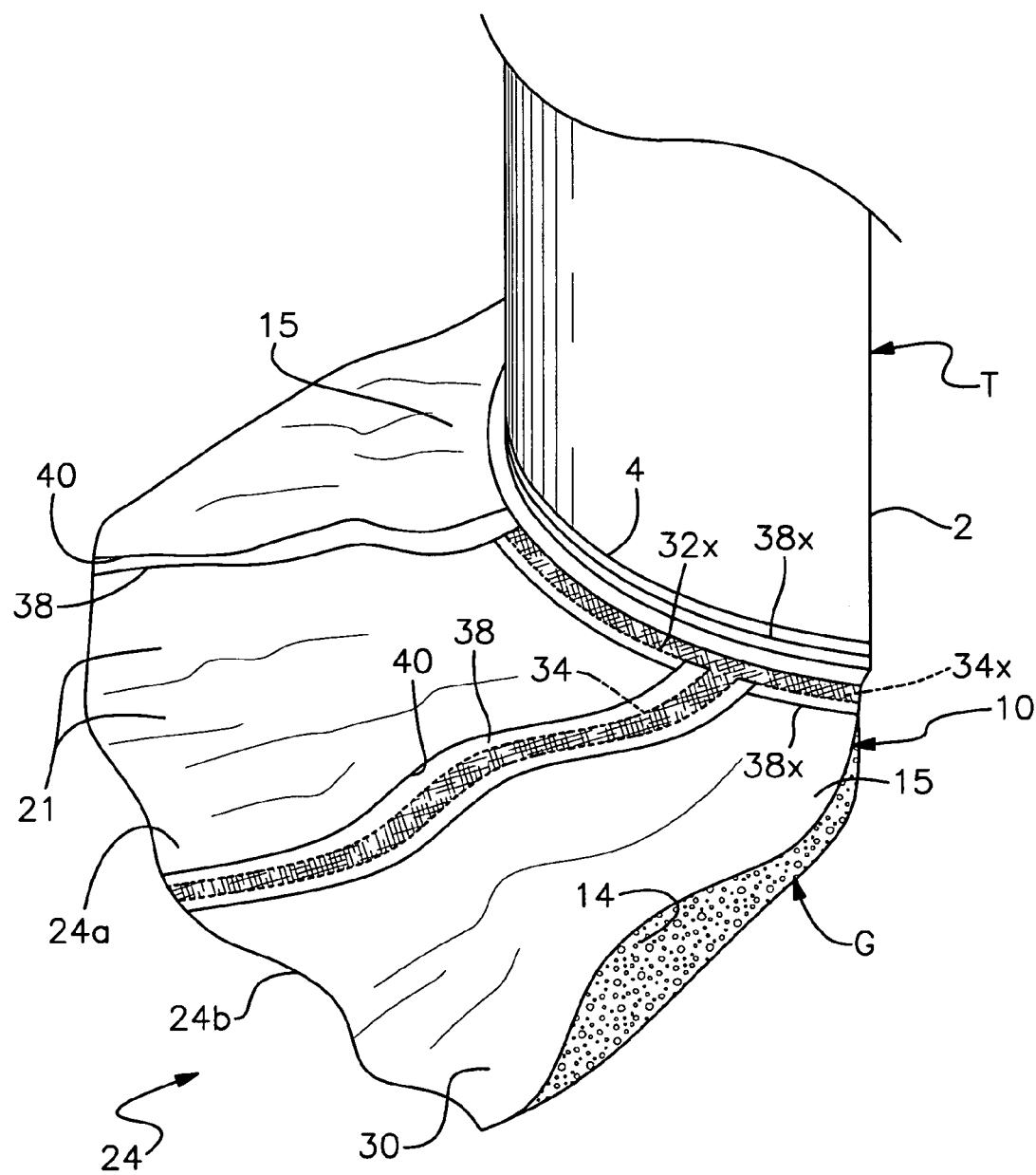
FIG. 1 is a fragmentary perspective view of a section of a secondary containment liner system assembled in accordance with the method this invention and installed about a liquid storage tank.

There is shown in FIG. 1 a section of a generally cylindrical above-ground storage tank T for accommodating an environmentally unfriendly and potentially hazardous material such as petroleum or various other types of chemicals. Although a typical tank has a generally cylindrical configuration, the particular size, shape and construction and type of tank are not limitations of this invention. Moreover, it should be understood that the containment liner system and the manner of assembling that system disclosed herein may be used in conjunction with various other primary containment facilities, including but not limited to, retention ponds that conventionally utilize secondary containment systems and related liners. Such systems are generally shown and described, for example, in pending U.S. application Ser. No. 12/215,615, filed Jun. 27, 2008 and Ser. No. 12/462,749, filed Aug. 7, 2009. In the representative embodiment illustrated herein, tank T includes a generally cylindrical tank shell 2 that is supported upon a concrete ring wall or slab 4. It should be understood that various alternative tank constructions may be utilized within the scope of this invention. It should also be understood that various types of liquids may be accommodated within tank T. Most commonly, such tanks are utilized to hold petroleum and other hydrocarbon fuels. Environmentally hazardous chemicals are also commonly stored in above-ground tanks of this type.

The secondary containment liner system 10 assembled in accordance with this invention, is installed about the primary containment tank in order to catch and retain liquid fuel, chemicals or other hazardous liquids that have spilled from tank T. This may be due, for example, to a leak in shell 2 of tank T or in pipes or other equipment associated with the tank. Spills can also be caused by overfilling the tank or by equipment malfunction. Liner system 10 comprises a flexible, liquid impermeable sheet that extends across the ground or other underlying surface G surrounding tank T. As set forth in pending U.S. application Ser. No. 12/462,749, liner 10 may be disposed either above or beneath the underlying surface G. The secondary containment system may also feature various other components including sensors, alarms, switches and valves (not shown), which react to a liquid spill by shutting off further pumping of liquid into tank T and which notify the owner/operator of the tank that a spill has occurred so that needed repairs and other corrective action may be performed.

Liner 10 is typically used in conjunction with an earthen berm 14 that encircles or otherwise surrounds tank T. Berm 14 comprises a liquid containment wall built upon and rising above the underlying ground surface G. The berm effectively defines a spill retention basin 15 between tank T and berm 14. Berm 14 may include earthen material such as native outsourced soils. Alternatively, the berm may include reinforced concrete, steel sheets driven into underlying ground surface G, concrete blocks, asphalt and other strong and durable construction material. Berm 14 is typically constructed in a generally annular fashion about the tank as shown, for example, in U.S. patent application Ser. Nos. 12/215,615 and 12/462,749. It is built at various select distances from the tank shell in order to provide the needed containment capacity. Preferably, the berm is formed about 5'-20' from the outer wall of the tank shell, although this distance may be varied. Berm 14 is normally constructed at a height of approximately 12"-24" above the underlying surface G beneath basin 15, although such height may again be varied to provide the needed secondary containment capacity about the tank. The berm features a sloped inner wall 16 generally facing tank T. It will be understood to persons skilled in the art that the berm may include various other non-annular configurations suited to conform to the area about the tank available for secondary containment. Typically, it is only necessary that the berm peripherally surround the tank so that spilled fluid is retained within the basin defined by the berm. The berm itself may have various shapes and configurations which would be known in the art.

A trench 21 is disposed annularly about tank T radially outwardly of berm 14 and immediately adjacent to the berm. This trench, which is optional, helps to securely retain impermeable liner 10 within the spill retention basin. Liner 10 includes an inner end 23 that engages and extends annularly about the upper surface of tank ring wall 4. The liner extends from inner end 23 outwardly across basin 15 and, in particular, covers berm 14 and the intermediate ground surface G formed between tank T and berm 14. The outer edge of liner 10 may extend into and/or through trench 21 and the liner may be secured to the underlying surface G by various conventional means. In the event of an accidental leak, overfill or spill of liquid, it is the purpose impermeable liner 10 to capture the leaked discharge liquid and retain it within basin 15 so that the liquid does not seep into the underlying water table and cause potentially serious environmental damage.

As previously described, secondary containment liners have traditionally been constructed and installed by configuring sheets of geotextile fabric about the storage tank so that the sheets extend across the ground and cover the area defining the spill retention basin, as well as the berm and trench. An impermeable coating is then conventionally sprayed onto the fabric and allowed to cure. As set forth above, this process is time consuming, labor and equipment intensive, expensive and quite inefficient.

Figure 2:
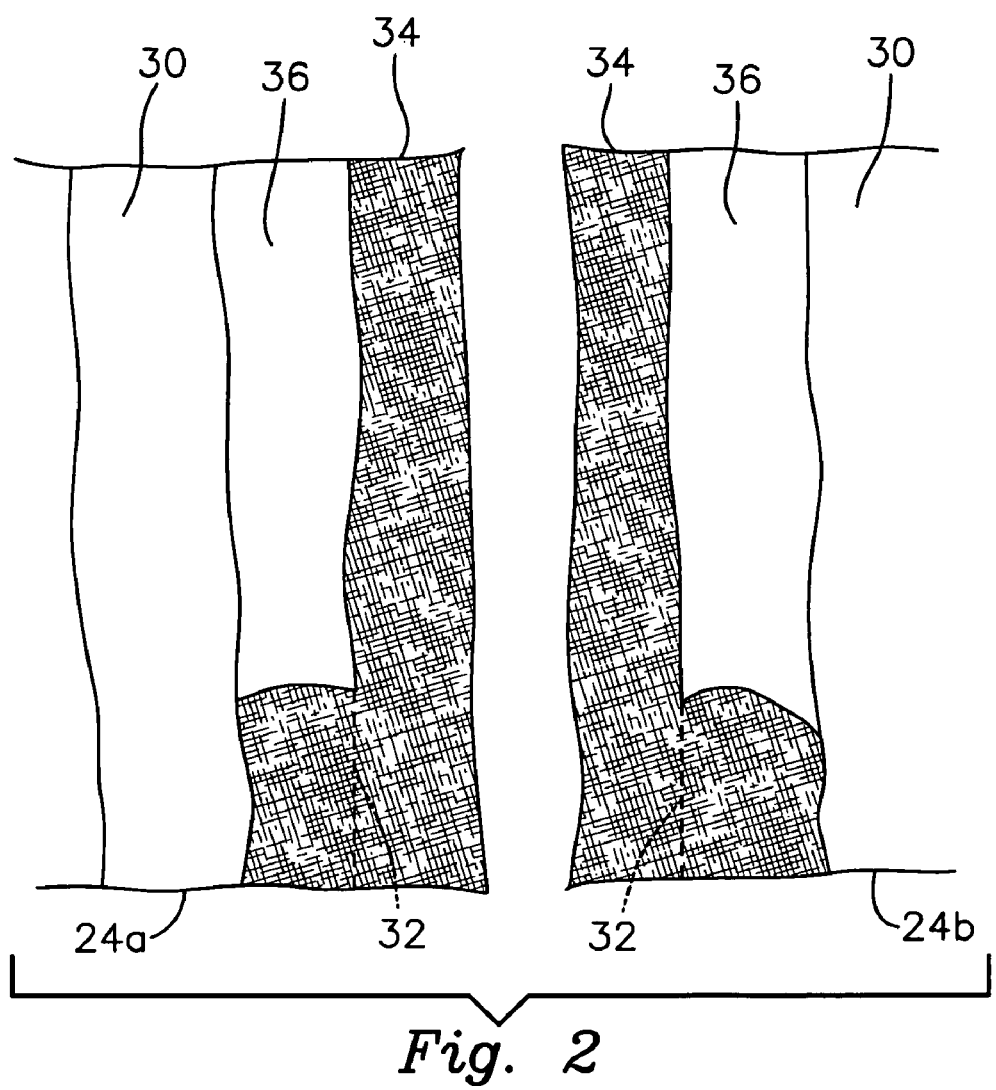
FIG. 2 is a top plan view of a pair of adjacent liner pieces that are assembled in accordance with the method of this invention.

The assembly method of the present invention overcomes the problems commonly exhibited by existing secondary containment liner systems. In particular, liner 10 features a plurality of individual liner pieces or segments, which are constructed and assembled in accordance with the novel method of this invention. A representative pair of adjoining liner pieces 24a and 24b are depicted in FIGS. 1 and 2 and described more fully below. The interconnection of these liner pieces is representative of the manner in which any number of adjoining liner pieces may be fastened together in a relatively fast, simple and cost efficient manner.

Figure 3:
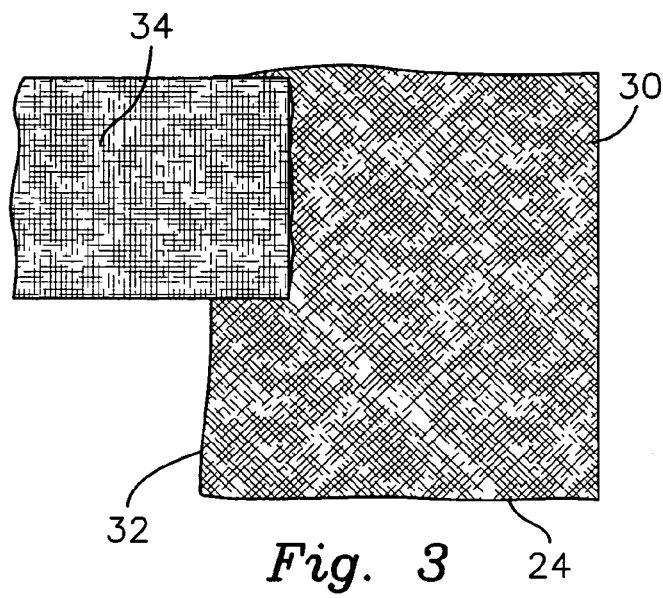
FIG. 3 is a top perspective view of a portion of a liquid impermeable sheet component with a section of a substrate element juxtaposed against and extending from a corresponding edge of the sheet component.

Each of adjoining liner pieces 24a and 24b includes a liquid impermeable sheet component 30 comprising an uncoated piece of flexible plastic material such as XR5(TM) or high density polyethylene (HDPE). Other, uncoated, liquid impermeable materials may be employed within the scope of this invention. The sheets components should be extremely durable and resistant to corrosive liquids and adverse weather conditions. It is important that the sheet components be uncoated so that polyurea or other traditional liquid impermeable materials do have to be sprayed onto the sheet components or otherwise applied thereto. This significantly reduces the on-site time, manpower, equipment and attendant expense usually required to apply polyurea or similar impermeable coating substances to the geotextile fabrics used by liners in the prior art. As further illustrated by representative component 24 in FIGS. 3 and 4, each sheet component 30 includes one or more leading edges 32 that are attached to respective corresponding edges 32 of one or more adjoining sheet components 30 such that the adjoining sheet components are fastened together. This attachment is accomplished by securing a respective substrate element 34 to the upper surface of each adjoining sheet component in the manner shown in FIGS. 2-6. More particularly, substrate element 34 includes a flexible, coating absorbent or supportive sheet-like material that overlaps an associated sheet component 30 along a corresponding leading edge 32 thereof. The substrate element should be manufactured independently of the sheet component 30 and secured to the sheet component by means such as bonding, heat welding or stitching.

Figure 5:
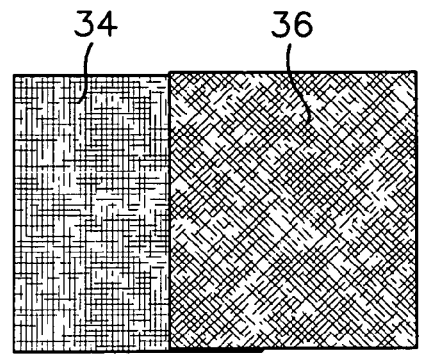
FIG. 5 is an upper perspective view of the mesh screen substrate fastened between the underlying sheet component and overlying attachment piece by means of bonding or heat sealing.
Figure 4:
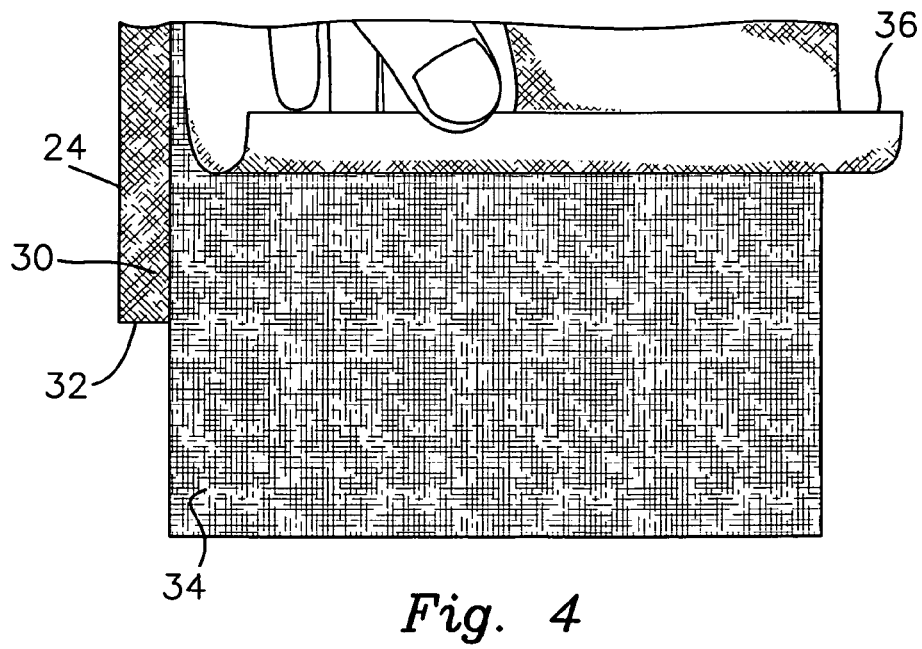
FIG. 4 is an upper perspective view of a screen mesh substrate element sandwiched between an underlying impermeable sheet component and an overlying smaller piece of the impermeable sheet component and prior to being bonded to the sheet component.
Figure 6:
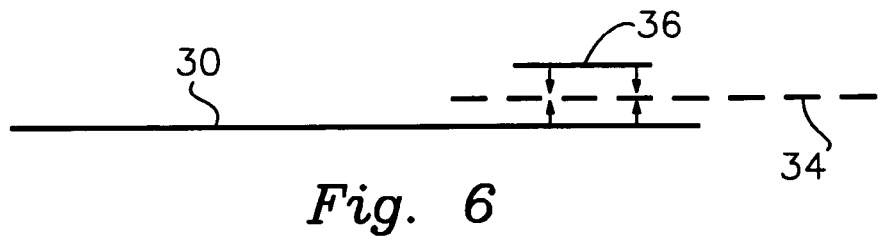
FIG. 6 is a side elevational and schematic view of a preferred manner for fastening the substrate element to an edge of the impermeable sheet component.

A preferred technique for securing the substrate element to the underlying sheet component is depicted in FIGS. 4-6. Specifically, substrate element 34 is disposed between the upper surface of sheet component 30 and an upper fastening piece 36 is superposed over substrate element 34, which is thereby sandwiched between fastening piece 36 and underlying sheet component 30. The fastening piece preferably comprises an uncoated, liquid impermeable sheet-like material of the type used for underlying sheet component 30. As best depicted in FIGS. 2 and 6, fastening piece 36 is much narrower/smaller than the underlying sheet component 30, which comprises the vast majority of each segment 24 of the assembled liner 10. The upper and lower pieces of XR5(TM), HDPE or alternative liquid impermeable sheeting 36, 30 are then secured permanently together by hot welding or similar bonding techniques. As a result, the screen mesh substrate 34 is permanently sealed between the sheet 30 and piece 36. See FIGS. 2 and 5. This completes a respective liner segment 24. Substrate elements 34 may be joined in a similar manner to any of the edges 32 of the individual sheet components 30 to provide for as many liner pieces 24 as required for a particular installation. These liner pieces 24 are then assembled and installed on-site in the following manner to form a secondary containment liner.

To sealably interconnect any adjoining pair of liner pieces 24a and 24b, the attached substrate elements 34 of the respective liner pieces are juxtaposed in a manner generally shown in FIG. 2. The respective screen mesh substrate elements 34 are overlapped with one another as shown in FIG. 7. An impermeable bonding material such as polyurea coating or an equivalent substance 38 is then sprayed onto or otherwise applied to the overlapping substrate elements 34, as well as to adjoining surfaces of the respective liner components 24a and 24b. As best shown in FIG. 1, the coating material defines an elongate impermeable strip 40 that covers the overlapping absorbent substrate elements 34 and adjoining areas of the attached sheets 30. As a result, a continuous and virtually seamless liner 10 is produced. Coating 38 is not applied across the entire upper surface of the liner, but instead, is applied only in discrete strips 40 formed along the respective adjoining edges of the liner components that are bonded together. Coating 38 serves to both achieve a secure interconnection between the adjoining liner components and effectively seals the overlapping substrate elements such that the liner remains effectively impermeable across the entire surface thereof.

As shown in FIG. 8, a technique analogous to that described above may also be used to effectively secure an edge of one or more individual liner components 24 (for example, either of segments 24a and 24b in FIG. 1) to ring wall 4 or similarly to some other penetration structure of the containment system. In particular, as shown in FIG. 8, uncoated impermeable sheet component 30 again has a screen mesh, or alternative coating absorbent substrate element 34x attached to and overlapping one of its edges 32x. As previously described, substrate element 34x is fastened to component 30 by sandwiching element 34x between the upper surface of component 30 and an overlying attachment piece 36x. As previously indicated, attachment piece 36x comprises an uncoated sheet-like material, namely XR5™, HDPE or other alternative composition, that is heat welded to underlying sheet 30 such that substrate element 34x is fastened securely to the underlying sheet component. A liquid impermeable coating 38x material, once again comprising polyurea, polyurethane or the like is sprayed or otherwise applied to the absorbent mesh substrate 34x, as well as to a portion of the vertical surface of ring wall 4. This forms a secure and liquid impermeable bond between the inner end of liner component 24 and the ring wall or other structural penetration of the secondary containment system.

In the version shown in FIG. 1, an analogous, but slightly different means is employed for attaching the inner edge 32x of liner 10 to ring wall 4. In particular, the impermeable coating 38x is applied over the attached substrate element 34x and is further applied across both the entire vertical face and a portion of the horizontal surface of ring wall 4. A secure and liquid impermeable bond is thereby formed between the inner end 32x of each impermeable sheet component 24 and the tank or ring wall. It should be understood that the substrate 34x may alternatively extend across some or all exposed surfaces of the ring wall or other penetration.

As shown in FIGS. 9-12, alternative versions of this invention may utilize one or more flexible panel components 110 that are manufactured at a factory and delivered to the site of a secondary containment system for assembly and installation therein. Each panel component 110 includes a sheet 130 of liquid impermeable material comprising, but not necessary limited to, materials such as HDPE, XR5™, etc. This should be a material that is impervious to the passage of liquid therethrough without the application of polyurea or any other type of coating substance traditionally applied in the factory, in the field or otherwise. A fibrous, fabric or otherwise absorbent backing strip 134 is stitched, heat welded, or otherwise securely attached at the factory or other manufacturing facility to impermeable and uncoated sheet 130. Preferably, fabric backing strip 134 has a width of about 6" although this may be varied between approximately 4" and 12" in accordance with this invention. Strip 134 extends along and follows one or more side edges of underlying sheet 130. Unlike the substrate of the previously described embodiment, backing strip 134 extends only to, and not beyond, a respective edge of underlying sheet 130.

One or more panel components 110 delivered to the site of a secondary containment system may be interconnected to adjoining sheets and/or to penetration structure (i.e. ring wall, tank, pipe, etc.) in the manner shown in FIGS. 9-10. In particular, a piece of geotextile fabric substrate 138, FIG. 9, may be utilized to secure component 110 respectively to a ring wall 4, as shown in FIG. 10, or to an adjoining panel component 110a as shown in FIG. 11. In the method of FIG. 10, component 110 is arranged to cover the underlying spill retention basin proximate to ring wall 4 or other penetration structure. A gap is shown in FIG. 10, although in alternative embodiments, the inner edge of component 110 may touch or be somewhat closer to wall 4. Substrate backing 134 is disposed on sheet 130 to face upwardly. Geotextile fabric 138 or, alternatively, some other type of porous, absorbent material, is engaged between backing 134 and ring wall 4. A liquid impermeable coating 139 is applied to fabric 138 and/or backing 134. Coating 139 is likewise applied to fabric 138 where that fabric interengages ring wall 4. The coating is allowed to cure so that a secure, liquid impermeable bond is created between panel component 110 and fabric 138. By the same token, the inner end of panel component 110 is effectively bonded to ring wall 4 so that the gap between component 110 and the penetration structure is sealed and the passage of liquid between component 110 and ring wall 4 is blocked.

In the version shown in FIG. 11, panel component 110 and analogous second panel component 110a are juxtaposed to adjoin one another. The respective backing strips 134, 134a of the panels face upwardly. The panels are joined and the seam between them sealed by applying geotextile fabric 138 or alternative absorbent fabric material over the adjoining edges of components 110, 110a that carry substrate backings 134, 134a respectively. Coating material 139 is again applied to fabric 138 and/or backing segments 134, 134a. Fabric 138 is pressed against the backing strips of the respective panel components. The structure is then allowed to cure so that a secure, liquid impermeable seal is formed between the adjoining panel components of the secondary containment system.

In FIG. 12, adjoining panel components 110 and 110b are sealably joined along a seam formed by respective overlapping edges of the panel components. In particular, the adjoining edges of the components carrying respective substrate backing strips 134 are overlapped and a selected one of the panel components 110 is inverted such that the respective backing strips 134 face or oppose one another. Coating 139 is applied to one or both of substrate backing strips 134. The opposing backing strips are then pressed together as indicated by arrows 150 such that they adhesively bond to one another. The adhesive coating material is allowed to cure so that a strong, liquid impermeable seal is formed between the adjoining panel components 110, 110a. It should be understood that in any of the embodiments of FIGS. 9-12, the coating may comprise polyurea or an alternative adhesive coating or bonding substance. It should also be noted that, within the scope of this invention, the adhesive coating may be applied either before or after the parts being bonded are interengaged.

Various alternative constructions may be employed and the technique described herein may be modified within the scope of this invention. For example, any edge of any uncoated sheet component may be fastened to the corresponding edge of an adjoining sheet component and/or to any one of various structural penetrations or other structural components within the containment system, as needed, in accordance with the method disclosed herein. The impermeable sheet component may comprise various types of durable, uncoated materials capable of containing hazardous liquids. The sizes and configurations of the sheet components may be varied within the scope of this invention. Likewise, the substrate element may include alternative types of coating absorbent or supportive materials such as natural and synthetic fabrics. Metals and plastics may be employed by the substrate elements. The substrate element may be secured to the underlying sheet component by gluing, stitching, heat welding and other forms of attachment. The use of an overlying attachment piece of uncoated and impermeable sheet-like material of the type used by the underlying sheet component is particularly preferred.

A secondary containment liner manufactured and assembled in the manner described herein exhibits significant advantages over conventional systems wherein polyurea or similar coatings are applied on-site. Large volumes of coating material do not have to be transported to the site and containers of such material do not have to be removed following installation. By the same token, complex and expensive applicator equipment does not have to be transported to and from the site. Instead, the liner system requires the use of only small amounts of impermeable coating material formed in discrete strips and to limited locations in the containment system. Assembly and installation of the liner is therefore facilitated considerably and assembly/installation costs are greatly reduced.

From the foregoing it may be seen that the apparatus of this invention provides for a method for assembling a secondary containment liner system of the type used to capture and contain the accidental discharge of petroleum, chemicals or other hazardous liquids. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A method of assembling a secondary containment liner system, said method comprising:
   providing liquid impermeable first and second sheet components;
   attaching a first substrate element to a leading edge of said first sheet component such that said first substrate element extends outwardly from said leading edge of said first sheet component;
   attaching a second substrate element to a second leading edge of said second sheet component such that said second substrate element extends outwardly from said second leading edge of said second sheet component;
   overlapping said first and second substrate elements; and
   applying a liquid impermeable coating material to said overlapping first and second substrate elements to sealably bond the overlapping first and second substrate elements and form a liquid impermeable strip between said liquid impermeable first and second sheet components.

2. The method of claim 1 including the step of providing impermeable sheet components that are uncoated.

3. The method of claim 1 including the step of applying at least one of polyurea and polyurethane to the overlapped first and second substrate components to sealably bond said first and second substrate components together.

4. The method of claim 1 in which said substrate elements includes a material for absorbing and supporting the coating material.

5. The method of claim 1 further including the step of attaching a third substrate element to a third leading edge of at least one of said first and second sheet components, overlapping said third substrate element with a penetration structure of a primary containment facility and adhesively securing said third substrate element to the penetration structure.

6. The method of claim 5 in which said penetration structure is selected from the group consisting of a containment tank, a pipe structure and a ring wall.

7. The method of claim 5 including the step of applying at least one of polyurea and polyurethane to the overlapped first and second substrate components to sealably bond said first and second substrate components together and applying at least one of polyurea and polyurethane to said third substrate element to sealably bond said third substrate element to said penetration structure.

8. The method of claim 5 in which said substrate elements include a material for absorbing and supporting the coating material.

9. The method of claim 1 further including the step of attaching a plurality of substrate elements to corresponding leading edges of said first sheet component such that each of said plurality of substrate elements extends outwardly from a respective corresponding leading edge of said sheet component, overlapping each of said plurality of substrate elements with a complementary substrate element attached to and extending from a corresponding second leading edge of an adjacent sheet component, and applying a liquid impermeable coating material to each pair of overlapping substrate elements to form a liquid impermeable strip between said first sheet component and each adjacent sheet component.

10. A method of assembling a secondary containment liner system comprising:
    providing an impermeable, uncoated sheet component adjacent to and extending outwardly from a primary containment facility;
    attaching a substrate element to a leading edge of said sheet component such that said substrate element extends outwardly from said leading edge of said sheet component;
    applying a curable liquid impermeable coating material to said substrate element;
    overlapping said substrate element with a penetration structure of said primary containment facility; and adhesively securing said substrate element to said penetration structure.

11. The method of claim 10 further including the step of providing uncoated, liquid impermeable sheet components.

12. The method of claim 10 in which said substrate element includes a material for absorbing and supporting the coating material.

13. The method of claim 10 in which said penetration structure is selected from the group consisting of a containment tank, a pipe structure and a ring wall.

14. A method of constructing a secondary containment system about a primary containment facility, said method comprising:

surrounding the containment facility with a berm that defines a spill retention basin between the containment facility and the berm;

juxtaposing a plurality of adjacent impermeable sheets to extend across the spill retention basin between the primary containment facility and the berm;

interconnecting an adjacent pair of sheet components by attaching to a first one of said adjacent sheet components a first substrate element that extends outwardly from a leading edge of said first sheet component, attaching to a second leading edge of a second one of said adjacent sheet components a second substrate element that extends outwardly from said second leading edge of said second sheet component, overlapping said first and second substrate elements and applying a liquid impermeable coating material to the overlapping substrate elements to bond the substrate elements and form a liquid impermeable strip between the adjacent first and second sheet components;

attaching a third leading edge of at least one of said adjacent sheet components to a penetration structure of the primary containment facility by attaching a third substrate element to said third leading edge such that said third substrate element extends from said third leading edge, overlapping the third substrate element with a penetration structure of the primary containment facility and adhesively securing the third substrate element to the penetration structure, whereby the impermeable sheet components are interconnected together and attached to the penetration structure of the primary containment facility to form a liquid impermeable liner extending across the spill retention basin between the berm and the primary containment facility.

15. A method of assembling a liner in a secondary containment system, said method comprising:

providing a liner component that includes an uncoated, liquid impermeable sheet and a fibrous backing strip attached to a leading edge of said sheet for absorbing and supporting a curable liquid impermeable coating;

applying a curable liquid impermeable coating to at least one of said fibrous backing strip and an adjoining second fibrous backing strip attached to a second leading edge of a second uncoated, liquid impermeable sheet of a second liner component;

interengaging said first and second fibrous backing strips to adhere said fibrous backing strips together; and allowing said coating to cure such that said first liner component is sealingly bonded to said second liner component.

16. A method of assembling a liner in a secondary containment system, said method comprising:

providing a first liner component that includes an uncoated, liquid impermeable sheet and a fibrous backing strip secured to and generally aligned with a leading edge of said first sheet for absorbing and supporting a curable liquid impermeable coating;

providing a second liner component that includes an uncoated, liquid impermeable second sheet and a second fibrous backing strip secured to and generally aligned with a second leading edge of said second sheet for absorbing and supporting a curable liquid impermeable coating;

providing a fabric element for extending across said first and second fibrous backing strips, said fabric element for absorbing and supporting a curable liquid impermeable coating;

applying a curable liquid impermeable coating to at least one of said fibrous backing strips and said fabric element;

interengaging said fabric element with said first and second fibrous backing strips to adhere said first fibrous backing strips to said second fibrous backing strip; and allowing said coating to cure such that said first liner component is sealingly bonded to said second liner component.

17. A method of assembling a liner in a secondary containment system, said method comprising:

providing a liner component that includes an uncoated, liquid impermeable sheet and a fibrous element attached to and extending from a leading edge of said sheet for absorbing and supporting a curable liquid impermeable coating;

applying a curable liquid impermeable coating to at least one of the fibrous element and a penetration structure of the secondary containment system;

interengaging said fibrous element and the penetration structure of the secondary containment system to adhere the fibrous element to the penetration structure and allowing said coating to cure such that said liner component is sealingly bonded to the penetration structure.

18. The method of claim 17 in which said fibrous element includes a backing strip secured to and generally aligned with an edge of the sheet and a fabric piece attached to the backing strip and extending beyond a leading edge of the sheet for engaging the penetration structure.

* * * * *